Figure 1:
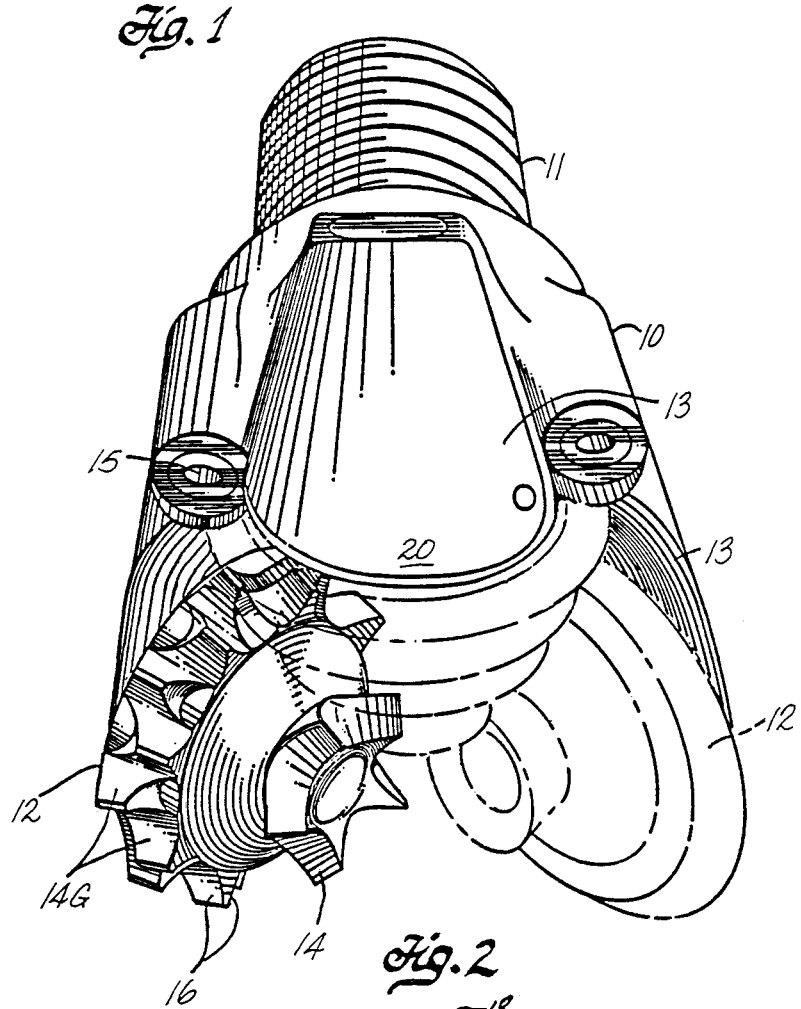

United States Patent [19]

Keshavan et al.

[11] Patent Number: 4,836,307
[45] Date of Patent: Jun. 6, 1989

[54] HARD FACING FOR MILLED TOOTH ROCK BITS

[75] Inventors: Madapusi K. Keshavan, Fullerton, Calif.; Lance D. Underwood, Spring, Tex.; Naresh J. Kar, Westminster, Calif.; Thomas W. Oldham, Mission Viejo, Calif.; Cary A. Roth, Moreno Valley, Calif.; Brian J. Armstrong, Seal Beach, Calif.

[73] Assignee: Smith International, Inc., Newport Beach, Calif.

[21] Appl. No.: 139,602

[22] Filed: Dec. 29, 1987

[51] Int. Cl.⁴ ............................................. E21B 10/50
[52] U.S. Cl. ..................................... 175/374; 51/309; 75/240; 428/557
[58] Field of Search .................. 175/374, 375, 411; 76/108 R; 51/309, 295, DIG. 26; 75/236, 240; 428/557, 558, 559

[56] References Cited

U.S. PATENT DOCUMENTS

| | | | |
|---|---|---|---|
| 2,660,405 | 11/1953 | Scott et al. | 175/375 |
| 2,833,520 | 5/1958 | Owen | 175/379 |
| 2,833,638 | 5/1958 | Owen | 428/559 |
| 2,939,684 | 6/1960 | Payne | 175/375 |
| 3,260,579 | 7/1966 | Scales et al. | 428/557 |
| 3,800,891 | 4/1974 | White et al. | 175/374 |
| 3,882,594 | 5/1975 | Jackson et al. | 228/122 |
| 3,989,554 | 11/1976 | Wisler | 285/333 |
| 4,017,480 | 4/1977 | Baum | 75/240 X |
| 4,053,306 | 10/1977 | Rodriguez | 75/123 J |
| 4,398,952 | 8/1983 | Drake | 75/240 X |
| 4,414,029 | 11/1983 | Newman et al. | 75/240 X |
| 4,719,076 | 1/1988 | Geczy et al. | 75/240 X |
| 4,726,432 | 2/1988 | Scott et al. | 175/375 |

OTHER PUBLICATIONS

H. Y. Sohn and C. Moreland, The Effect of Particle Size Distribution On Packing Density, *The Canadian Journal of Chemical Engineering*, vol. 46, Jun. 1968, pp. 162 to 167.

*Primary Examiner*—Stephen J. Novosad
*Assistant Examiner*—David J. Bagnell
*Attorney, Agent, or Firm*—Christie, Parker & Hale

[57] ABSTRACT

A hard facing for teeth on a milled tooth rock bit comprises at least 65% by weight of a mixture of tungsten carbide particles and a balance of steel bonding the carbide particles together and to the cutter cone of the rock bit. The tungsten carbide particle mixture comprises from 35% to 80%, and preferably from 65% to 80%, by weight 20 to 30 mesh cemented tungsten carbide, and from 20% to 65%, and preferably from 20% to 35% by weight 40 to 89 mesh single crystal monotungsten carbide.

8 Claims, 1 Drawing Sheet

HARD FACING FOR MILLED TOOTH ROCK BITS

BACKGROUND OF THE INVENTION

This invention relates to a wear-resistant hard facing composition applied to wear surfaces on teeth on bits for drilling oil wells or the like.

Bits for drilling oil wells and the like commonly have a steel body which is connected at the bottom of a drill string. Steel cutter cones are mounted on the body for rotation and engagement with the bottom of a hole being drilled to crush, gouge, and scrape rock for drilling the well. One important type of rock bit referred to as a milled tooth bit has roughly triangular teeth protruding from the surface of the cone for engaging the rock. The principal faces of such a milled tooth that engage the rock are usually dressed with a layer of hard facing material to resist wear. The specific tooth geometry forms no part of this invention.

Conventional hard facing usually comprises particles of tungsten carbide bonded to the steel teeth by a metal alloy. In effect, the carbide particles are suspended in a matrix of metal forming a layer on the surface. Most hard facing on rock bits employs steel as the matrix, although other alloys may also be used.

It is quite common in referring to the material in the hard facing merely as "carbide" without characterizing it as tungsten carbide. The metal carbide principally used in hard facing is tungsten carbide. Small amounts of tantalum carbide and titanium carbide may be present, although considered to be deleterious. It will be understood that as used herein, reference merely to "carbide" means tungsten carbide.

A typical technique for applying hard facing to the teeth on a rock bit is by oxyacetylene or atomic hydrogen welding. A welding "rod" or stick is formed of a tube of mild steel sheet enclosing a filler which is primarily carbide particles. The filler may also include deoxidizer for the steel, flux and a resin binder. The hard facing is applied by melting an end of the rod on the face of the tooth. The steel tube melts to weld to the steel tooth and provide the matrix for the carbide particles in the tube. The deoxidizer alloys with the mild steel of the tube.

Three types of tungsten carbide have been employed for hard facing. Possibly the most common is crushed cast carbide. Tungsten forms two carbides, WC and $W_2C$ and there can be an essentially continuous range of compositions therebetween. Cast carbide is typically a eutectic mixture of the WC and $W_2C$ compounds, and as such is substoichiometric, that is, it has less carbon than the more desirable WC form of tungsten carbide. Cast carbide is frozen from the molten state and comminuted to the desired particle size.

Another type of tungsten carbide is so-called macrocrystalline tungsten carbide. This material is essentially stoichiometric WC in the form of single crystals. Most of the macrocrystalline tungsten carbide is in the form of single crystals. When larger particle sizes are examined, it is found that some bicrystals of WC are formed. Macrocrystalline WC is desirable for its toughness and stability.

The third type of tungsten carbide used in hard facing comprises cemented tungsten carbide, sometimes referred to as sintered tungsten carbide. Cemented tungsten carbide comprises small particles of tungsten carbide (e.g., 1 to 15 microns) bonded together with cobalt. Cemented tungsten carbide is made by mixing tungsten carbide and cobalt powders, pressing the mixed powders to form a green compact, and "sintering" the composite at temperatures near the melting point of cobalt. The resulting dense cemented carbide can then be comminuted to form particles of cemented tungsten carbide for use in hard facing.

Although mild steel sheet is used when forming the tubes, the steel in the hard facing as applied to a rock bit is a hard, wear resistant, alloy steel. This occurs by reason of the oxidizers such as silicon and manganese mixed in the filler in the tube and dissolution of tungsten, carbon, and possibly cobalt, from the tungsten carbide during welding. There may also be some mixing with alloy steel from the teeth on the cone.

It is important to provide as much wear resistance as possible on the teeth of a rock bit cutter cone. The effective life of the cone is enhanced as wear resistance is increased. It is desirable to keep the teeth protruding as far as possible from the body of the cone since the rate of penetration of the bit into the rock formation is enhanced by longer teeth (however, unlimited length is infeasible since teeth may break if too long for a given rock formation). As wear occurs on the teeth, they get shorter and the drill bit may be replaced when the rate of penetration decreases to an unacceptable level. It is desirable to minimize wear so that the footage drilled by each bit is maximized. This not only decreases direct cost, but also decreases the frequency of having to "round trip" a drill string to replace a worn bit with a new one.

Thus, advances in wear resistance of hard facing are desirable to enhance the footage a drill bit can drill before becoming dull, and to enhance the rate of penetration of such drill bits. Such improvements translate directly into reduction of drilling expense.

BRIEF SUMMARY OF THE INVENTION

There is, therefore, provided in practice of this invention according to a presently preferred embodiment, a novel blend of types of tungsten carbide, and a higher proportion of tungsten carbide relative to the binder steel than had previously been considered feasible. The composition for the hard facing comprises more than 68% by weight filler and a balance of steel. Preferably the steel is present in the range of from 18% to 32% by weight, with filler in the range of from 68% to 82% by weight. The filler preferably comprises from 20% to 35% by weight single crystal monotungsten carbide, WC, from 65% to 80% by weight particles of cemented tungsten carbide, and a balance of steel deoxidizer. Preferably, the particle size of the cemented tungsten carbide is larger than the particle size of the single crystal WC. The proportion of larger particles of cemented tungsten carbide to single crystal monotungsten carbide can be in the range of from 35:65 to 80:20 and the size ratio can be in the range of from two to five, preferably about three. When applied on the teeth of a milled tooth rock bit, increases in footage drilled of up to 37% have been achieved. Rate of penetration has shown increase of up to 18% as compared with rock bits with other hard facing.

DRAWINGS

Figure 2:
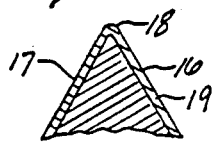

These and other features and advantages of the present invention will be appreciated as the same becomes better understood by reference to the following detailed description when considered in connection with the accompanying drawings wherein:

FIG. 1 is a perspective view of a milled tooth rock bit constructed, according to principles of this invention; and FIG. 2 is a fragmentary cross section of an exemplary tooth on such a rock bit.

DESCRIPTION

An exemplary milled tooth rock bit comprises a stout steel body 10 having a threaded pin 11 at one end for connection to a conventional drill string. At the opposite end of the body there are three cutter cones 12 for drilling rock for forming an oil well or the like. Each of the cutter cones is rotatably mounted on a pin (hidden) extending diagonally inwardly on one of the three legs 13 extending downwardly from the body of the rock bit. As the rock bit is rotated by the drill string to which it is attached, the cutter cones effectively roll on the bottom of the hole being drilled. The cones are shaped and mounted so that as they roll, teeth 14 on the cones gouge, chip, crush, abrade, and/or erode the rock at the bottom of the hole. The teeth 14G in the row around the heel of the cone are referred to as the gage row teeth. They engage the bottom of the hole being drilled near its perimeter on "gage." Fluid nozzles 15 direct drilling mud into the hole to carry away the particles of rock created by the drilling.

Such a rock bit is conventional and merely typical of various arrangements that may be employed in a rock bit. For example, most rock bits are of the three cone variety illustrated. However, one, two and four cone bits are also known. The arrangement of teeth on the cones is just one of many possible variations. In fact, it is typical that the teeth on the three cones on a rock bit differ from each other so that different portions of the bottom of the hole are engaged by the three cutter cones so that collectively the entire bottom of the hole is drilled. A broad variety of tooth and cone geometries are known and do not form a specific part of this invention.

Exemplary teeth on such a cone are generally triangular in a cross-section taken in a radial plane of the cone. Such a tooth has a leading flank 16 and trailing flank 17 meeting in an elongated crest 18. The flanks of the teeth are covered with a hard facing layer 19. Sometimes only the leading face of each tooth is covered with a hard facing layer so that differential erosion between the wear-resistant hard facing on the front flank of a tooth and the less wear-resistant steel on the trailing face of the tooth tends to keep the crest of the tooth relatively sharp for enhanced penetration of the rock being drilled.

The leading face of the tooth is the face that tends to bear against the undrilled rock as the rock bit is rotated in the hole. Because of the various cone angles of teeth on a cutter cone relative to the angle of the pin on which the cone is mounted, the leading flank on the teeth in one row on the same cone may face in the direction of rotation of the bit, whereas the leading flank on teeth in another row may on the same cone face away from the direction of rotation of the bit. In other cases, particularly near the axis of the bit, neither flank can be uniformly regarded as the leading flank and both flanks may be provided with a hard facing.

There are also times when the ends of a tooth, that is, the portions facing in more or less an axial direction on the cone, are also provided with a layer of hard facing. This is particularly true on the so-called gage surface of the bit which is virtually always provided with a hard facing. The gage surface is a generally conical surface at the heel of a cone which engages the side wall of a hole as the bit is used. The gage surface includes the outer end of teeth 14G in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some embodiments, hard facing may also be applied on the shirttail 20 at the bottom of each leg on the bit body.

Such structure of a milled tooth rock bit is well known and does not form a specific portion of this invention, which relates to the specific hard facing material employed on the teeth of a milled tooth cutter cone.

Thus, in practice of this invention, the hard facing material comprises a mixture of relatively larger particles of cemented tungsten carbide and relatively smaller particles of single crystal monotungsten carbide, WC. The carbide particles are in a matrix of alloy steel welded to the alloy steel of the teeth of the cutter cone.

As used herein, cemented tungsten carbide refers to a material formed by mixing particles of tungsten carbide, typically monotungsten carbide, and particles of cobalt or other iron group metal, and sintering the mixture. In a typical process for making cemented tungsten carbide, carbide and cobalt particles are vigorously mixed with a small amount of organic wax which serves as a temporary binder. An organic solvent may be used to promote uniform mixing. The mixture may be prepared for sintering by either of two techniques: it may be pressed into solid bodies often referred to as green compacts; alternatively, it may be formed into granules or pellets such as by pressing through a screen, or tumbling and then screened to obtain more or less uniform pellet size.

Such green compacts or pellets are then heated in a vacuum furnace for first evaporating the wax and then to a temperature near the melting point of cobalt (or the like) which causes the tungsten carbide particles to be bonded together by the metallic phase. After sintering, the compacts are crushed and screened to a desired particle size. The crushed cemented carbide is generally much more angular than the pellets which tend to be rounded. The sintered pellets tend to bond together during sintering and are crushed to break them apart. These are also screened to obtain a desired particle size. Cemented tungsten carbide from such compacts may be made specifically for use in hard facing, may be manufacturing scrap from making other products, or may be scrap from worn out tungsten carbide products crushed and screened for this purpose.

Single crystal monotungsten carbide is commercially available from Kennametal, Inc., Fallon, Nev. This material is sometimes known as macro-crystalline tungsten carbide.

This material is to be distinguished from so-called cast tungsten carbide. Cast tungsten carbide has approximately the eutectic composition between bitungsten carbide, $W_2C$, and monotungsten carbide, WC. The cast carbide is typically made by resistance heating tungsten in contact with carbon in a graphite crucible having a hole through which the resultant eutectic mixture drips. The liquid is quenched in a bath of oil and is subsequently comminuted to a desired particle size. Cast carbide is brittle due to residual stresses from this thermal treatment and, when used in a hard facing composition attached by welding with alloy steel, may deplete carbon from the steel since the carbon content is substoichiometric with respect to the stable WC.

Hard facing is applied to the teeth and gage surface by welding with a "rod" in the form of a mild steel tube containing the particles of cemented tungsten carbide and single crystal WC.

A composition within the tube for hard facing inner rows of teeth, that is, rows other than the gage row, employs 20 to 30 mesh cemented tungsten carbide. In an exemplary embodiment, there is a minimum of 65% of the carbide particles retained on a 30 mesh screen. No more than 10% is retained on a 20 mesh screen, and no more than 25% passes through the 30 mesh screen. None of the particles are larger than 14 mesh. The grain size of the tungsten carbide grains in the particles of cemented tungsten carbide are in the range of from about one to fifteen microns. The binder content in such a cemented tungsten carbide is preferably in the range of from 6% to 8% by weight and is preferably cobalt. Preferably the material is substantially free of tantalum carbide and titanium carbide.

The single crystal WC is preferably in the range of from 40 to 80 mesh Thus, the crystals are all smaller than 40 mesh and at least 80% are larger than 80 mesh. No more than 5% should pass a 100 mesh screen.

The ratio of particle size of the larger particles of cemented tungsten carbide to smaller monocrystalline carbide can be in the range of from two to five. A larger ratio is less desirable since the smaller particles can be so small that excessive solution in the alloy steel matrix may occur. A size ratio of three is preferred.

With such particle size ranges for the cemented tungsten carbide and the single crystal monotungsten carbide, the cemented carbide particles are about three times as large as the single crystal WC. The 30 mesh material has a particle size of about 0.52 mm, and 80 mesh material has a particle size of about 0.17 mm.

A composition for hard facing teeth on the gage row employs 80 to 200 mesh cemented tungsten carbide. The single crystal monotungsten carbide is preferably in the range of from 200 to 325 mesh. The finer particle sizes work better on the gage row teeth whereas the larger particles are better on the teeth of the inner rows. Generally speaking, the hard facing with larger particles is tougher and more resistant to breakage, whereas the smaller particles result in a more wear resistant hard facing.

The weight ratio of the larger particle size cemented tungsten carbide to the smaller particle size single crystal WC is in the range of from 35:65 to 80:20, and preferably in the range of from 65:35 to 80:20. In a particularly preferred embodiment, the proportion of larger size cemented tungsten carbide is 75% by weight and the smaller particle size single crystal WC is 25%. A substantial proportion of the cemented carbide is preferred for enhanced toughness of the hard facing.

In addition to the carbide in the filler in the tube, it is desirable to include up to five percent by weight of deoxidizer and temporary resin binder. A suitable deoxidizer is silico-manganese obtained from Kennemetal, Inc., Fallon, Nev. The nominal composition of the silico-manganese is 65% to 68% manganese, 15% to 18% silicon, a maximum of 2% carbon, a maximum of 0.05% sulfur, a maximum of 0.35% phosphorus, and a balance of iron. Preferably about four percent deoxidizer is used. A small amount of thermoset resin is desirable for partially holding the particles together in the tube so that they do not simply fall out during welding. A half percent is adequate.

An exemplary filler composition can be made up using 25 kg of 40 to 80 mesh single crystal monotungsten carbide, 75 kg of 20 to 30 mesh crushed cemented tungsten carbide, 4 kg of silico-manganese deoxidizer, and 0.5 kg of phenolic resin binder. The particles are coated with the resin suspended in an alcohol solution which is then dried. After the tubes are loaded with the filler and the ends crimped, the ends are dipped in a solution of phenolic resin in alcohol to add some binder at the ends. The binder is then heat cured to temporarily bind the particles together.

The proportion of filler to the weight of the steel tube within which it is enclosed in an exemplary embodiment is 70% to 80% filler and 20% to 30% tube. These proportions can vary by plus or minus 2%. Thus, the weight of filler is in the range of from 68% to 82% and the weight of the tube is in the range of from 18% to 32%. This results in a higher proportion of carbide in the hard facing than in previous hard facing materials where the weight ratio of the carbide to the steel is about 60:40.

To obtain a weight ratio of filler to steel of 70:30, a 5/32 inch (4 mm) diameter tube is made with steel sheet having a thickness of 0.017 inch (0.43 mm). Roughly the same proportions are obtained in a 3/16 inch (4.8 mm) diameter tube by making it with steel sheet 0.02 inch (0.5 mm) thick.

The hard facing material is applied to the faces of the tooth by heating the face to a welding temperature by an oxyacetylene or atomic hydrogen torch. When a suitable temperature is reached, the above-described tubular welding "rod" is melted onto the face of the tooth. In an exemplary embodiment, the thickness of the hard facing layer is about 1/16 to 3/32 inch (1.6 to 2.4 mm) Dissolution of the silico-manganese in the mild steel of the tube, possible dissolution of some of the tungsten, carbon, and cobalt of the carbides, and mixing of metal from the body of the cutter cone results in an alloy steel matrix for the carbide particles. Microscopic examination after the cutter cone is carburized, quenched, and tempered indicates a Martensitic phase transformation in the alloy steel matrix of the hard facing.

The hard facing provided in practice of this invention has proved to be more wear-resistant on the teeth of milled tooth cutters than the prior hard facing employing single crystal WC. Comparisons were made by hard facing alternate teeth on a cutter cone with the prior hard facing materials and with the improved hard facing material provided in practice of this invention. In every bit where this was done, the teeth having the improved hard facing was as good as or better than the prior hard facing. In many bits prior hard facing showed a much greater amount of wear than the teeth having improved hard facing formed of a high proportion of relatively larger particles of cemented tungsten carbide and relatively smaller particles of single crystal monotungsten carbide.

The improvement in performance of the hard facing translates directly into increased footage of well drilled and increased rate of penetration, both of which translate directly into lowered costs for the driller.

The enhanced performance may arise from a variety of factors. Generally speaking, the cemented tungsten carbide is tougher than either the cast carbide or the single crystal carbide. Thus, having relatively large particles of cemented tungsten carbide provides a toughness to the hard facing which resists breakage. Further, the single crystal monotungsten carbide is a tougher material than the cast carbide which is subject to residual stresses, and even cracks, due to rapid quenching from high temperature and subsequent comminution.

Further, the single crystal monotungsten carbide is harder than the cemented carbide and therefore more resistant to wear. It also provides a hard material with sharp edges for effective cutting of rock formation as the rock bit is used, the cemented carbide tending to be more rounded and with fewer sharp edges. By mixing relatively larger particles of cemented tungsten carbide with relatively smaller particles of single crystal tungsten carbide, denser packing of the carbide particles can be obtained than when there is no difference in particle size. Thus, the proportion of carbide to steel in the hard facing material can be higher, nominally, about six to ten percent higher.

The proportion of carbide in the hard facing is determined largely by the proportion in the welding "rod" used for applying the hard facing. Some dilution may occur by alloy steel from the surface of the tooth on the cutter cone. This dilution is not a large contributor since in a typical application of hard facing to a milled tooth cutter cone for a rock bit, the thickness of hard facing is in the order 2 mm. The amount of dilution depends to some extent on the technique employed by the welder applying the hard facing.

The carbide content in the hard facing can be estimated by metallographic examination of a cross section through the hard facing. The approximate areas of the carbide and binder phases can be determined. From this, the volume percentages of binder and carbide can be estimated, and in turn the weight percentages. Since use of deoxidizer in the filler of a welding tube is essential to producing void free binder phase, the dilution of the carbide filler can be taken into account and the ratio of filler weight to tube weight approximated. A hypothetical tube type welding rod can be projected from a hard facing deposited on the surface by other techniques.

Thus, for consistency in this specification, the proportion of carbide to alloy steel in the hard facing is considered on the basis of carbide content in the stick used to melt the hard facing onto the surface. As pointed out above, the filler of carbide, binder and deoxidizer is 70 % to 80% by weight (plus or minus 2%) of the stick and the mild steel tube is 20% to 30% by weight (plus or minus 2%). The filler is about 96% carbide (plus or minus 2%), with a balance of deoxidizer and binder. Thus, as deposited, the carbide content, if both "minus" tolerances were to occur could be as low as 64% by weight, and if both "plus" tolerance levels occurred could be as high as 79% by weight. It is generally found in practice that the actual carbide content of the hard facing as found on the faces of the teeth on the rock bit after welding is more than 65% by weight and preferably 72% or more.

However, regardless of such factors, as used in this specification, the carbide content is referred to as the filler content of a tube used to weld the hard facing on the face of the rock bit tooth.

The high packing density of the relatively larger cemented tungsten carbide particles and relatively smaller single crystal carbide particles is appropriate for resisting hypothesized wear mechanisms for hard facing material. One mechanism for wear is believed to be fracture of carbide particles. Tougher carbide such a cemented tungsten carbide and single crystal monotungsten carbide enhance resistance to this wear mechanism.

The other postulated wear mechanism comprises "extrusion" or yielding and consequent wear of the binder phase securing the carbide particles to the substrate. Wear of the binder leaves carbide particles exposed and unsupported for possible fracture. One way of enhancing wear resistance of the binder is to make it stronger and harder. An alloy steel binder as used in practice of this invention provides such hardness and strength while retaining sufficient toughness to keep the hard facing intact.

Another way of enhancing wear resistance of the binder is to reduce the mean distance between particles so that the binder layer is thinner. This can be done by having smaller particles, but this may diminish the cutting ability of the teeth on the cutter cone. The enhanced packing density and higher proportion of carbide to binder provided in practice of this invention also reduce the mean distance between particles or thickness of the binder phase which may be subject to deformation and wear.

In portions of a rock bit where abrasion by rock formation is a more significant wear mechanism than impact of rock surfaces on the hard facing, a high proportion of single crystal WC may be employed with three times the weight percentage of larger particles than smaller particles, and with the larger particles being three times as large as the smaller particles. This provides a suitable particle size distribution for reducing the mean free path of binder between adjacent particles. In this way the abrasion resistance of the hard single crystal WC can be advantageously combined with the resistance of the binder to extrusion and wear that would leave the carbide unsupported.

Generally speaking, the proportion of carbide to steel in the hard facing should be maximized for best wear resistance. This desideratum is promoted by employing two different size particles for enhanced packing density. This tends to decrease toughness of the hard facing. Toughness is maintained by employing larger particles of cemented carbide and smaller particles of monocrystalline carbide which have greater toughness than cast carbide. The properties of the hard facing in the harsh environment encountered by a rock bit are not simple functions of particle size and proportion since there is interaction with the matrix as well.

Other modifications and variations of hard facing for a rock bit will be apparent to one skilled in the art. It is, therefore, to be understood that within the scope of the appended claims, this invention may be practiced otherwise than as specifically described.

What is claimed is:

1. A rock bit comprising:
   a rock bit body having means at one end for connecting the bit to a drill string;
   at least one cutter cone mounted for rotation on the opposite end of the body;
   such a cutter cone comprising a steel body with a plurality of teeth protruding therefrom, at least a portion of the teeth having a wear surface coated with a hard facing composition, the hard facing composition comprising:

at least 68% by weight of a mixture of tungsten carbide particles and a balance of alloy steel bonding the tungsten carbide particles together and to the steel body, the tungsten carbide particle mixture comprising cemented tungsten carbide particles in the range of from 35% to 80% by weight and single crystal monotungsten carbide in the range of from 20% to 65% by weight.

2. A rock bit as recited in claim 1 wherein the cemented tungsten carbide particles are present in the hard facing in the range of from 65% to 80% by weight and the single crystal monotungsten carbide is present in the hard facing in the range of from 20% to 35% by weight.

3. A rock bit as recited in claim 1 wherein the tungsten carbide particle mixture comprises about 75% by weight cemented tungsten carbide and about 25% by weight single crystal monotungsten carbide.

4. A rock bit as recited in claim 1 wherein the particle size of the cemented tungsten carbide particles is from two to five times larger than the particle size of the single crystal monotungsten carbide particles.

5. A rock bit as recited in claim 1 wherein the particle size of the cemented tungsten carbide particles is about three times larger than the particle size of the single crystal monotungsten carbide particles.

6. A rock bit as recited in claim 1 wherein the cemented tungsten carbide particle size is primarily in the range of from 20 to 30 mesh.

7. A rock bit as recited in claim 6 wherein the single crystal monotungsten carbide particle size is primarily in the range of from 40 to 80 mesh.

8. A rock bit as recited in claim 1 wherein the tungsten carbide particles are in the range of from 68% to 82% by weight and the steel is in the range of from 18% to 32% by weight.

* * * * *